Figure 1:
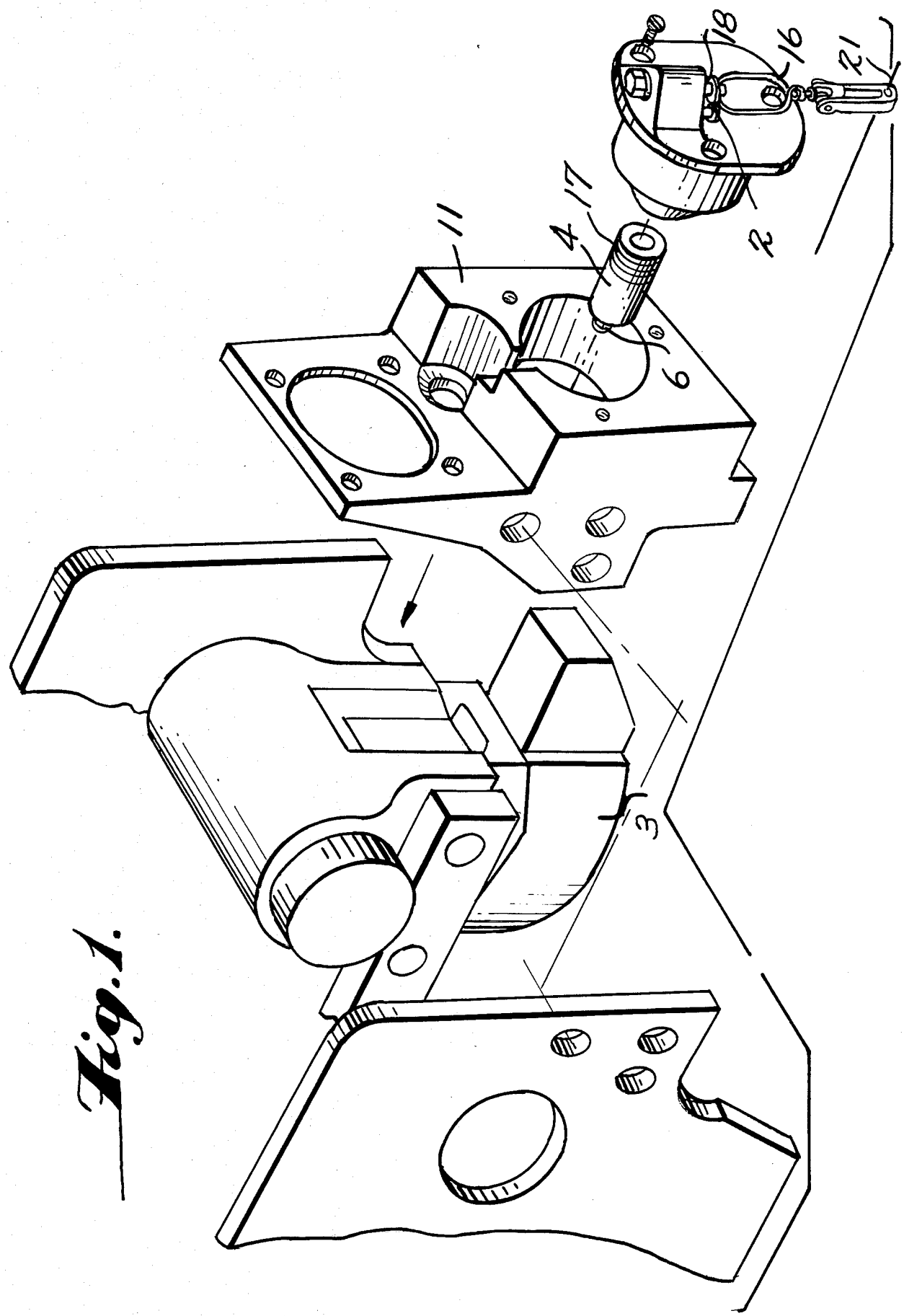

United States Patent [19]

Robinson

[11] Patent Number: 4,520,711
[45] Date of Patent: Jun. 4, 1985

[54] LOOP RETENTION DEVICE FOR HOOK OPERATED BOMB ARMING SOLENOIDS

[75] Inventor: Paul R. Robinson, Williamstown, Australia

[73] Assignee: The Commonwealth of Australia, Canberra, Australia

[21] Appl. No.: 448,997

[22] PCT Filed: Mar. 12, 1982

[86] PCT No.: PCT/AU82/00025
§ 371 Date: Nov. 10, 1982
§ 102(e) Date: Nov. 10, 1982

[87] PCT Pub. No.: WO82/03272
PCT Pub. Date: Sep. 30, 1982

[30] Foreign Application Priority Data

Mar. 13, 1981 [AU] Australia ............... PE7983

[51] Int. Cl.³ .......................... F41F 5/02; B64D 1/04
[52] U.S. Cl. ............................ 89/1.5 D; 244/137 R
[58] Field of Search ............. 89/1.5 D, 1.5 R, 1.5 G, 89/1.5 H, 1 R; 244/137 R

[56] References Cited

U.S. PATENT DOCUMENTS

| | | | |
|---|---|---|---|
| 2,845,003 | 7/1958 | Thomas | 89/1.5 D |
| 2,891,447 | 6/1959 | Buecker | 89/1.5 D |
| 2,922,340 | 1/1960 | Wilkie | 89/1.5 D |
| 2,992,594 | 7/1961 | Anderson et al. | 89/1.5 D |
| 3,200,707 | 8/1965 | West | 89/1.5 D |
| 3,285,132 | 11/1966 | McCurdy | 89/1.5 D |
| 3,831,486 | 8/1974 | Yost | 89/1.5 D |
| 3,998,124 | 12/1976 | Milhous et al. | 89/1.5 D |
| 4,088,055 | 5/1978 | West et al. | 89/1.5 D |
| 4,212,225 | 7/1980 | Correll et al. | 89/1.5 D |
| 4,266,462 | 5/1981 | Carter et al. | 89/1.5 D |

FOREIGN PATENT DOCUMENTS

| | | |
|---|---|---|
| 594749 | 9/1925 | France . |
| 742208 | 4/1932 | France . |
| 513725 | 10/1939 | United Kingdom . |

Primary Examiner—David H. Brown
Attorney, Agent, or Firm—Cushman, Darby & Cushman

[57] ABSTRACT

A loop retention device for hook operated bomb arming solenoids (13) in which when effecting unarmed release a telescopic plunger (4-6) is displaced by spring means (14) when the bomb release hooks (3) move including the armature (12) of the solenoid (13) which is de-energized to completely release a lanyard, but when a bomb is to be armed the solenoid (13) remains energized and the telescopic member (4-6) acts to lock the armature (12) of the solenoid (13) and the release control pin (2) in a holding position irrespective of whether the solenoid (13) is energized or not.

6 Claims, 4 Drawing Figures

LOOP RETENTION DEVICE FOR HOOK OPERATED BOMB ARMING SOLENOIDS

This invention relates to devices used to control the operation of bomb fuses to provide for armed or safe release.

Bombs are carried on aircraft by being engaged on carriers which have hook means adapted to engage appropriate sockets on the bombs to lock the bombs in position during flight but allowing the bombs to be released by actuation of the hook means at the appropriate time.

To arm such bombs the arming mechanism in the bomb is connected by means of a lanyard to an attachment on the aircraft which is adapted to engage a loop on the end of the lanyard when the bomb is loaded, the loop being pushed between a pair of pin members, the one being a release control pin moved into a locking position in relation to an eject pin by a push rod which is actuated by the hooks which hold the bomb, the eject pin being spring-loaded into its holding position and having adjacent it an eject member surrounding the eject pin, which eject member is loaded so that while the eject member can be pushed back to allow the loop on the end of the lanyard to be engaged behind the junction of the release control pin and the eject pin, when the release control pin is withdrawn the eject member moves down to ensure that the loop is forced from the eject pin for safe release.

The sequence of operation is that when the bomb is placed in position in the carrier and the hooks are engaged to hold the bomb, a push rod moves the release control pin, which is spring-loaded, into its protruding position against pressure of the spring and into engagement with the eject pin which is disposed at right angles to the release control pin to form the space into which the loop can be pushed by displacing the eject pin and the eject member against their spring-loading.

When the bomb is released, the push rod is free to move back and the release control pin will be withdrawn by spring tension and the loop will be forced from the eject pin by the spring-loaded eject member so that during the initial movement of the hooks which hold the bomb the safe release occurs of the lanyard.

If however arming is to take place a solenoid surrounding the release control pin is energised and the release control pin is firmly held against displacement so that when the hooks start to move to release the push rod, while the push rod is free to move back, the release control pin cannot do so and the loop is firmly held to cause the pull on the lanyard to arm the bomb, the lanyard having a weak link device in it adjacent to the loop, or forming part of the loop, so that after arming the bomb the weak link breaks away from the loop and the lanyard falls with the bomb.

This however leaves the loop and the upper part of the weak link dangling from the device together with, in some cases, a short length of main lanyard depending on the position of the weak link. With this type of mechanism a problem can occur in high speed aircraft such as the F-111 where the power energising the solenoid must be switched off before the landing wheels can be lowered and when the power is switched off the release control pin will be automatically withdrawn by its spring-loading because the push rod is not now engaging the hook mechanism in the bomb carrier and release of the loop and the attached piece of lanyard with at least part of the weak link on it can cause serious damage to the aircraft because of the high speeds of travel involved, and it is desirable therefore to prevent this release when the power is cut from the electromagnet.

The object of this invention is to so modify the mechanism that in spite of the power being cut, the loop and its attachments will remain firmly locked by the release control pin and the eject pin.

The object is achieved by a telescopic push rod disposed between an arming plunger and the hooks so arranged that when a bomb is released by hook movement during an arming action at which the solenoid remains energised the release control pin is locked in its loop-holding position even when the solenoid is subsequently de-energised.

In order however that the nature of the invention will be fully appreciated an embodiment thereof will now be described with reference to the accompanying drawings in which—

Figure 2:
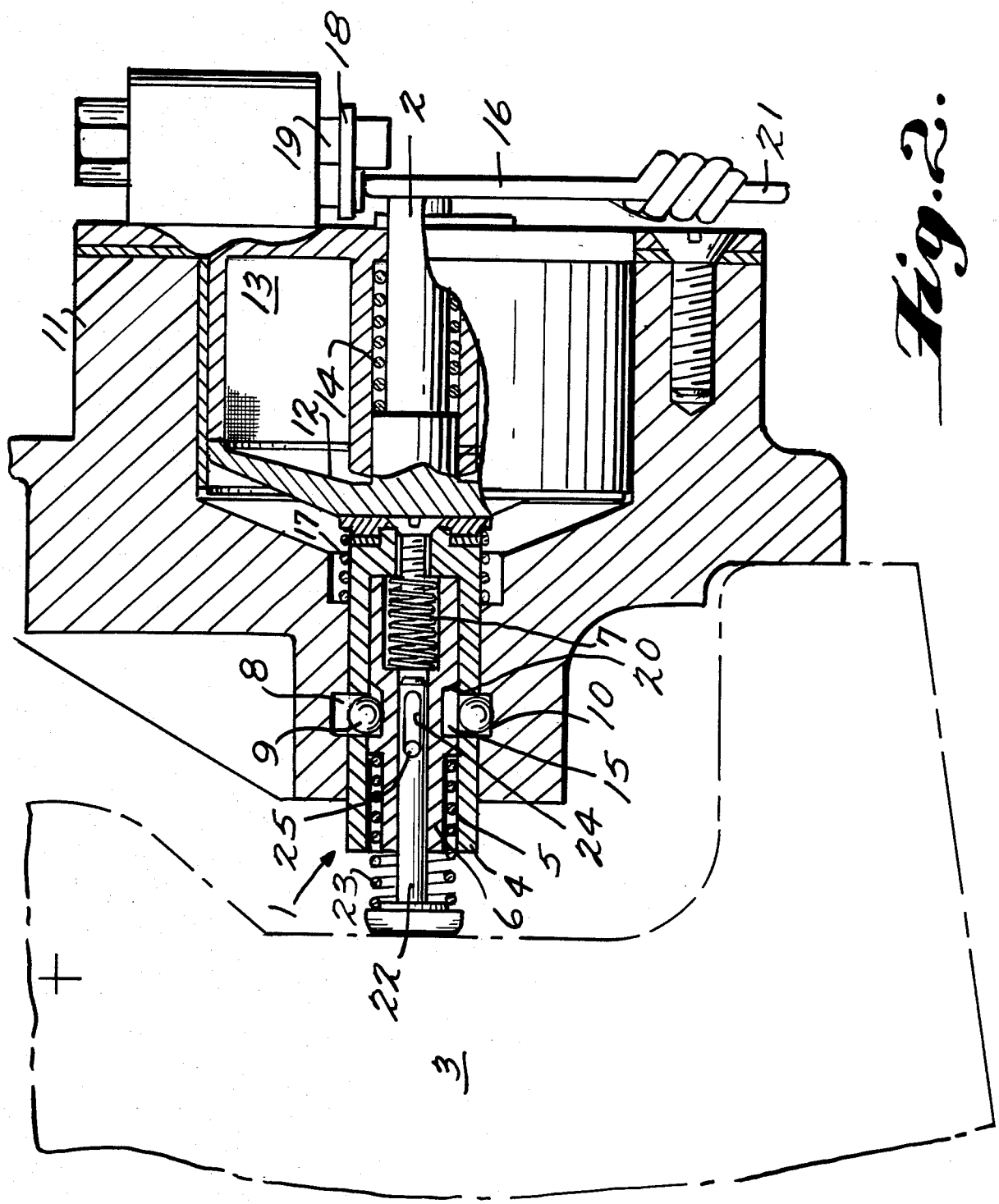
Figure 3:
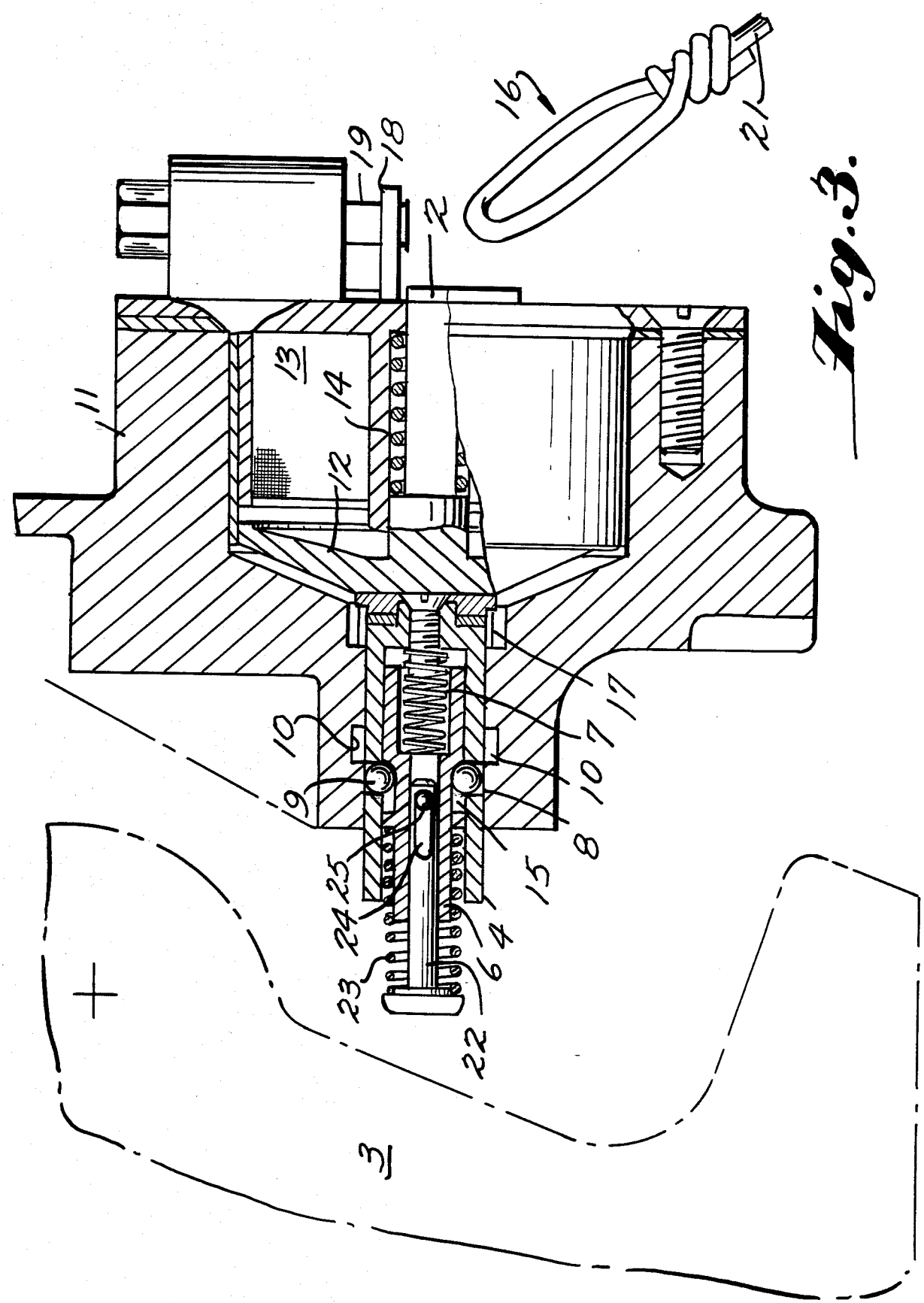
Figure 4:
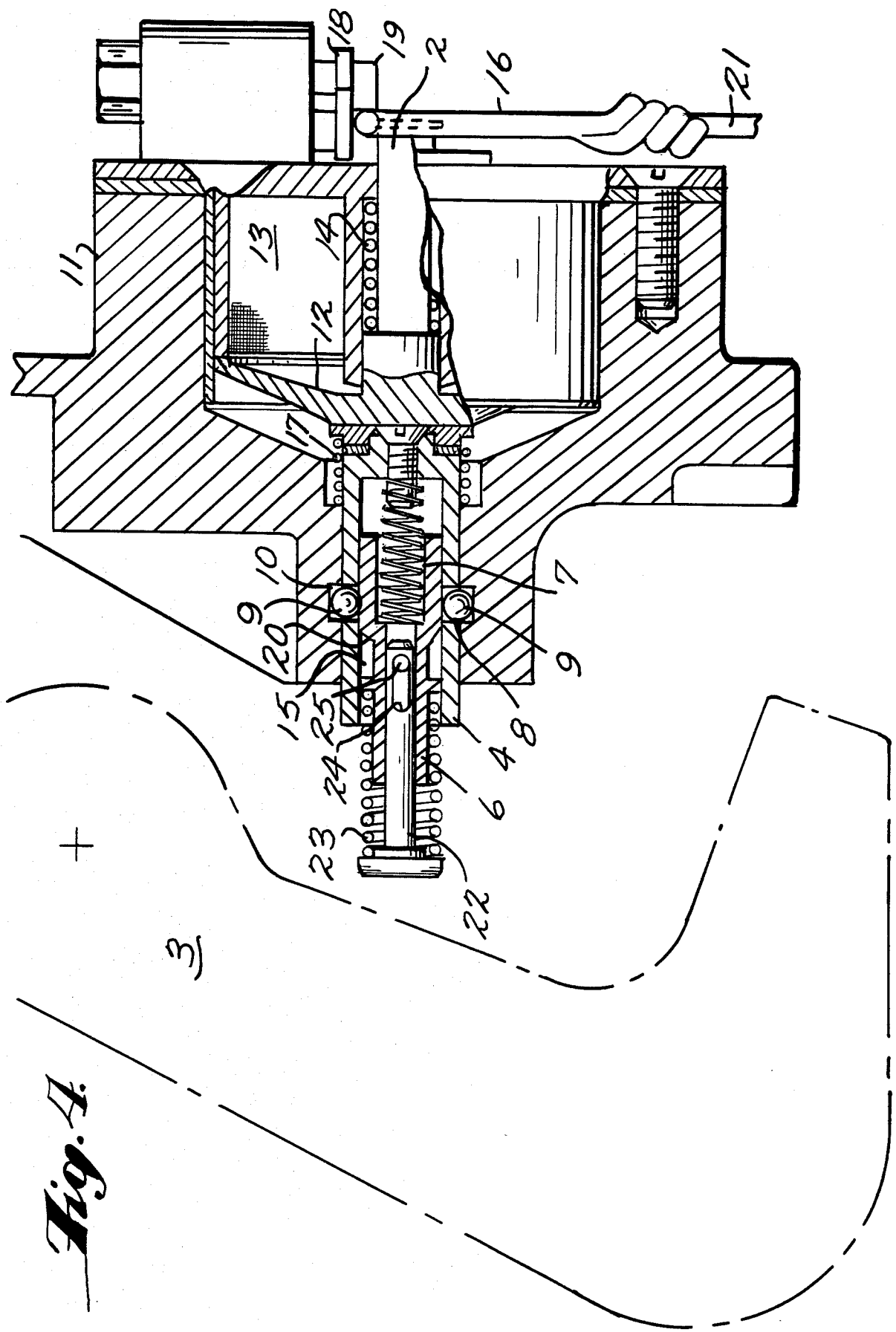

FIG. 1 is an exploded view showing the hook assembly and the telescopic push rod and solenoid unit, FIG. 2 is a longitudinal section of the general mechanism including the push rod which is the feature of this invention and showing the hook in chain lines, the arrangement being that of the assembly during normal carriage prior to release of a bomb held by the hook, FIG. 3 is a similar view but showing how a "safe" release is made during which when the solenoid is de-energised the loop together with the bomb is released without the bomb being armed, and FIG. 4 is a similar view but showing the position after arming and release of a bomb has taken place, showing how the solenoid is locked in its energised position by the telescopic member being locked to the housing to prevent the release control pin from being withdrawn even though the solenoid is de-energised.

The mechanism according to this invention comprises a push rod 1 between the release control pin 2 and the hook mechanism 3 for the bomb, which push rod 1 is telescopic so that it can have two different lengths, this improved push rod comprising a first outer member 4 which has an axial bore 5 part way through it carrying an inner second member 6 which is loaded outwardly by a spring 7 but is slidable in the bore 5. Movement is limited by a pin 25.

The outer member 4 has transverse bores 8 through its wall each being adapted to have a ball 9 positioned in it so that these balls normally are located in part in the bore of the outer member 4 and can be pushed outwardly in the bores 8 to engage an annular recess 10 in the housing 11 at an appropriate time to lock the outer member 4 axially in position in relation to the housing 11 where it prevents the control pin 2 which is attached to the armature 12, of the solenoid 13 from moving under influence of the spring 14 when the solenoid is de-energised.

The balls 9 are controlled in their position by movement of the inner member 6 which has a circumferential groove 15 into which the balls 9 can be retracted while still guided in the bore 8 in the outer member 4 and before the bomb is released, this member is inwardly projected by the hook 3 to allow the balls 9 to move inwardly in the bores 8 so as not to lock the outer member 4 to the housing 11.

When the release of the bomb is to take place without arming, the solenoid is de-energised and the spring 14 presses the armature 12 of the solenoid in the direction required to withdrawn the release control pin 2 and the balls are in a position where they do not lock the outer member 4. When the bomb is released the whole assembly comprising the telescopic member 4-6 and the control pin 2 moves rearwardly with the hook mechanism 3 to withdraw the release control pin 2 and this in turn allows the loop 16 to be ejected forcibly by the spring-loaded member 18 which presses on the loop 16 and which encircles a second pin 19, referred to as the eject pin, to force the loop 16 out of contact with the eject pin 19 and free it.

This is the position when an unarmed release is to take place and the loop 16 must be released. In this position the loop 16 is forced off the release control pin 2 and the eject pin 19 so that the loop 16 is released when the bomb is released.

When the bomb is to be armed the solenoid 13 holds the armature 12 in the position where the release control pin 2 projects against the eject pin 19 to confine the loop 16 in the space defined between them, and at this stage, as the armature 12 is electrically held and the outer member 4 is held against it by the spring 17 the inner member 6 is pushed rearwardly by the spring 7 to follow movement of the hook member 3 to cause the balls 9 to be forced by a sloping surface 20 of the circumferential groove 15 into the groove 10 in the housing and so locking the member 4 in the housing 11, and because the solenoid 13 remains energised the loop 16 is held captive and the release control pin 2 could not move even if the balls were not in position.

After arming a bomb the lanyard 21 attached to the loop 16 by a weak link assembly (not shown) has part of it locked to the mechanism because the solenoid 13 has remained activated to hold the loop 16 and it is thus held so long as the aircraft is in action, but immediately standard landing procedures commence the power is automatically switched off from the solenoid 13 and at that stage the balls 9 become effective because the inner member 6 has moved outwardly to force the balls 9 into the circumferential groove 10 in the housing 11 and the outer member 4 is firmly locked against outward movement by the balls 9 and remains so locked to hold the residual part of the lanyard 21 and the loop 16 from being discharged.

If it is desired the rear end of the push rod 4-6 can have a secondary plunger 22 projecting from a bore in the inner member 6 and loaded outwardly by a spring 23 but confined in movement by a slot 24 and the keeper pin 25. The spring 23 is relatively strong so that the push rod 4-6 is held firmly against the inner end of the release control pin through the solenoid armature and the inner member 6 is pushed inward compressing the spring 7. This arrangement allows the release control pin and push rod to be tested for freedom of movement when the bomb hooks are engaged in that it allows some movement of this pin when it is depressed. Plunger 22 also gives built-in adjustment to the length of the push rod allowing interchangeability between bomb carriers. If plunger 22 is not needed, either member 6 bears against hook 3 or a means of adjustment such as a screw may be provided.

From the foregoing it will be realised that a bomb arming device is envisaged which is somewhat similar to the present arming devices but with the safety feature that the loop and any part of the lanyard which remains attached after an armed release is held by the mechanism and is not released at any stage during flight even though the electromagnet is de-energised, thereby removing a danger of damage to the aircraft which at present is very real.

I claim:

1. A loop retention device for hook operated bomb arming solenoids having hooks to releasably carry the bomb, and means to engage and disengage an arming lanyard so that the bomb may be dropped in a safe state by releasing the arming lanyard, or dropped in an armed state by retaining the arming lanyard which after arming separates from the bomb, and wherein the said arming lanyard is retained on a release control pin actuated by a solenoid, characterised by a telescopic push rod disposed between the release control pin and the said hooks so arranged that when a bomb is released by hook movement during an arming action during which the solenoid remains energised, the release control pin is locked in its loop-holding position by detent means in the telescopic push rod and continues to be held after the solenoid is subsequently de-energised, the said telescopic push rod comprising an outer member arranged to move with the said release control pin engaged with an armature of said solenoid, an inner member slidable relative to said outer member and spring loaded to press toward said hook member, said detent means being moved by the said inner member to lock the said outer member against movement when said hooks are actuated to release a bomb in an armed state and said solenoid is actuated to prevent release of said lanyard, said detent means being adapted to retain said outer member and thus said release control pin against movement even after said solenoid is de-energised.

2. A loop retention device for hook operated bomb arming solenoids as defined in claim 1, further characterised in that the said detent means are disposed between said inner and outer member and a recess in the base of a housing carrying said push rod, the arrangement being such that on an armed release the solenoid armature is held to retain said arming lanyard on said release control pin and said detent means locks the push rod and solenoid in said arming position.

3. A loop retention device for hook operated bomb arming solenoids having hooks to releasably carry the bomb, and means to engage and disengage an arming lanyard so that the bomb may be dropped in a safe state by releasing the arming lanyard, or dropped in an armed state by retaining the arming lanyard which after arming separates from the bomb, and wherein the said arming lanyard is retained on a release control pin actuated by a solenoid, characterised by a telescopic push rod disposed between the release control pin and the said hooks so arranged that when a bomb is released by hook movement during an arming action during which the solenoid remains energised, the release control pin is locked in its loop-holding position by detent means in the telescopic push rod and continues to be held after the solenoid is subsequently de-energised, the said telescopic push rod having an inner member slidable in an outer member, spring means to urge the said inner member outwardly to extend the effective length of the said telescopic push rod, transverse bores in the said outer member containing said detent means retractable into said outer member, recess means in a housing slidably supporting the said outer member, means on the said inner member to engage the said detent means in said recess means in said housing when said outer member is positioned to hold the said release control pin in the lanyard loop-locking position, said means on the said inner member retaining the said detent means while the said inner member is in its outwardly projected position whereby to lock the assembly against release of the said lanyard.

4. A loop retention device for hook operated bomb arming solenoids according to claim 1 wherein the said detent means are balls positioned in transverse bores extending through the outer member but projectable inwardly in part into a recess in the said inner member to allow the said outer member to move axially, but projectable in part outwardly by movement of the said inner member to engage recess means in a housing carrying the said outer member and the said solenoid and release control pin to lock the said outer member against axial movement in the said housing so long as the said inner member is in its outwardly urged position.

5. A loop retention device for hook operated bomb arming solenoids according to claim 1 characterised in that the telescopic push rod has an inner member slidable in an outer member, spring means to urge the said inner member outwardly to extend the effective length of the said telescopic push rod, transverse bores in the said outer member containing said detent means retractable into said outer member, recess means in a housing slidably supporting the said outer member, means on the said inner member to engage the said detent means in said recess means in said housing when said outer member is positioned to hold the said release control pin in the lanyard loop-locking position, said means on the said inner member retaining the said detent means while the said inner member is in its outwardly projected position whereby to lock the assembly against release of the said lanyard, and means to allow the said release control pin to be displaced when the said inner member is inwardly held by the said hook means which comprise: a plunger axially slidable in said inner member, means to limit movement of said plunger in said inner member, and spring means urging said plunger outwardly.

6. A loop retention device for hook operated bomb arming solenoids in which hooks releasably carry the bomb, and solenoid means control an arming lanyard so that the bomb may be dropped in a safe state by releasing the arming lanyard, or dropped in an armed state to retain the arming lanyard, and in which the arming lanyard is retained on a release control pin actuated by the said solenoid which is carried by a housing, characterised by an arrangement such that when the solenoid is de-energised prior to movement of the bomb release hooks when effecting unarmed release, a telescopic push rod means having an inner member and an outer member moves back as a complete unit with the release control pin and with detent means carried by the push rod retracted, but when the said solenoid remains energised during movement of the bomb release hooks only, the inner telescopic member of the said push rod moves to urge detent means outwardly in bores in the outer telescopic member to engage the said detent means in recess means in the housing to lock the outer member and thus the armature of the solenoid and the control pin in place to prevent release of the loop on the arming lanyard.

* * * * *